United States Patent
Rowles et al.

(10) Patent No.: US 6,252,852 B1
(45) Date of Patent: Jun. 26, 2001

(54) NETWORK FAULT SYSTEM

(75) Inventors: Christopher David Rowles; Peter Paul Sember; Mark Szymczak, all of Victoria (AU)

(73) Assignee: Telestra Corporation Limited, Melbourne (AU)

( * ) Notice: Subject to any disclaimer, the term of this patent is extended or adjusted under 35 U.S.C. 154(b) by 0 days.

(21) Appl. No.: 09/117,590

(22) PCT Filed: Jan. 31, 1997

(86) PCT No.: PCT/AU97/00055

§ 371 Date: Feb. 11, 1999

§ 102(e) Date: Feb. 11, 1999

(87) PCT Pub. No.: WO97/28626

PCT Pub. Date: Aug. 7, 1997

(30) Foreign Application Priority Data

Feb. 2, 1996 (AU) .................................................. PN 7868

(51) Int. Cl.[7] ....................................................... H04L 1/24
(52) U.S. Cl. ............................................. 370/242; 455/423
(58) Field of Search ..................... 370/242; 455/423–425, 455/456, 457

(56) References Cited

U.S. PATENT DOCUMENTS

| | | | |
|---|---|---|---|
| 4,547,633 | * 10/1985 | Szechenyi | 370/242 |
| 5,309,448 | * 5/1994 | Bouloutas et al. | 370/242 |
| 5,446,874 | 8/1995 | Waclawsky et al. | |
| 5,757,774 | * 5/1998 | Oka | 370/242 |
| 5,946,373 | * 8/1999 | Harris | 370/242 |
| 6,072,776 | * 6/2000 | Takamichi | 370/242 |
| 6,167,265 | * 12/2000 | Kim et al. | 455/424 |
| 6,178,327 | * 1/2001 | Gomez | 370/242 |

FOREIGN PATENT DOCUMENTS

| | | |
|---|---|---|
| 20062/95 | 6/1994 | (AU) . |
| 3400691 A1 | 1/1984 | (DE) . |
| 4218499 A1 | 6/1991 | (DE) . |
| 0 549 949 A2 | 12/1991 | (EP) . |
| 0503785A2 | 2/1992 | (EP) . |
| 2113954 | 12/1981 | (GB) . |
| 2271918A | 10/1992 | (GB) . |
| 07235965A | 9/1995 | (JP) . |

OTHER PUBLICATIONS

Derwent Abstract Accession No. 93–355676/45, class W01, W02 JP, A, 05–260026 (FUJITSU Ltd) Oct. 8, 1993.
Derwent Abstract Accession No. 94–298134/37, class W01, JP, 06–224876 (FUJITSU Ltd) Aug. 12, 1994.
Derwent Abstract Accession No. 65–107306/18, class W02 JP, A, 60–051041 (TOHOKU) Mar. 22, 1985.
Derwent Abstract Accession No. 87–090569/13, class W02 JP, A, 62–040830 (NEC Corp) Feb. 21, 1987.

* cited by examiner

*Primary Examiner*—Salvatore Cangialosi
(74) *Attorney, Agent, or Firm*—Flehr Hohbach Test Albritton & Herbert LLP

(57) ABSTRACT

The fault system includes an interface for accessing first data fault representative of faults in the reported by users of mobile stations of the network, an interface for accessing second fault, data representative of faults in the network determined by a network analysis system, and pattern matching device for allocating the first and second fault data to fault patterns, representative of faults having at least one common characteristic. The common characteristics is geographic location and fault type. The fault system further includes pattern generation device for generating the fault pattern using respective fault templates to allocate the fault data to the fault patterns.

32 Claims, 2 Drawing Sheets

NETWORK FAULT SYSTEM

The present invention relates to a network fault system for a mobile telecommunications network, and to a fault pattern matching process.

Telecommunications networks include switching equipment which is able to provide extensive data on the state of performance of the equipment and other aspects of the network. However in a network which is not fixed and is subject to a variety of operating conditions, such as a mobile telecommunications network, the data provided by the equipment can only provide information on the network to the extent that operating conditions are known. For a mobile network, it is presently impossible to determine from the network equipment the precise location, and hence the operating conditions, for a mobile station. Therefore it is difficult to determine whether faults reported by users or customers of the network are due to a fault in the network or not. It would be advantageous to have a system which can use network fault data and information provided by users of a mobile network to form groups of related fault data that could be used to corroborate faults.

In accordance with the present invention there is provided a network fault system for a mobile telecommunications network including:

a first interface for accessing first fault data representative of faults reported by users of mobile stations of said network;

a second interface for accessing second fault data representative of faults in said network determined by a network analysis system; and pattern matching means for allocating said first and second fault data to fault patterns representative of faults having at least one common characteristic.

The present invention also provides a fault pattern matching process including:

accessing first fault data representative of faults reported by users of mobile stations of a mobile telecommunications network;

accessing second fault data representative of faults in said network determined by a network analysis system; and allocating said first and second fault data to fault patterns representative of faults having at least one common characteristic.

Figure 1:
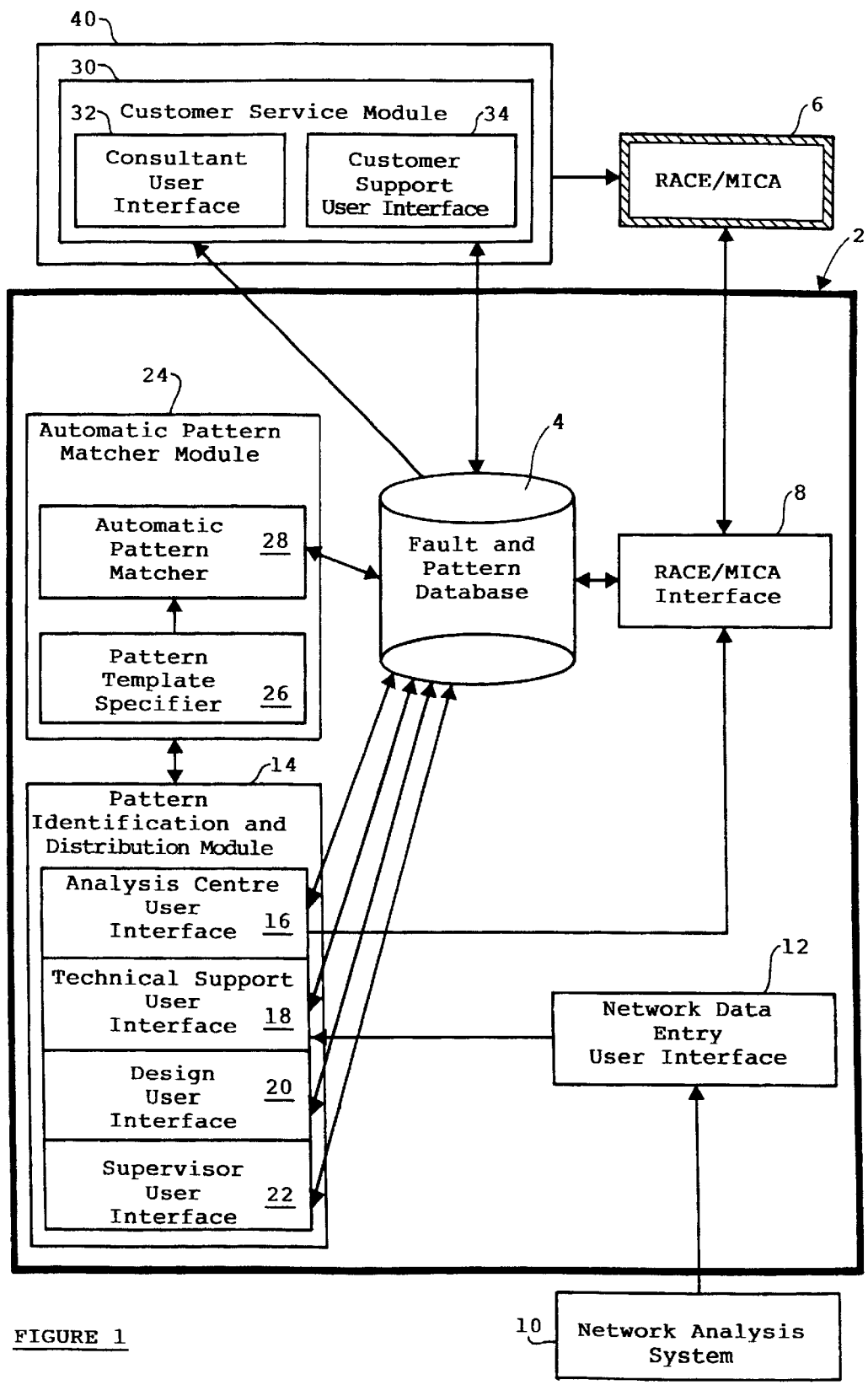
Figure 2:
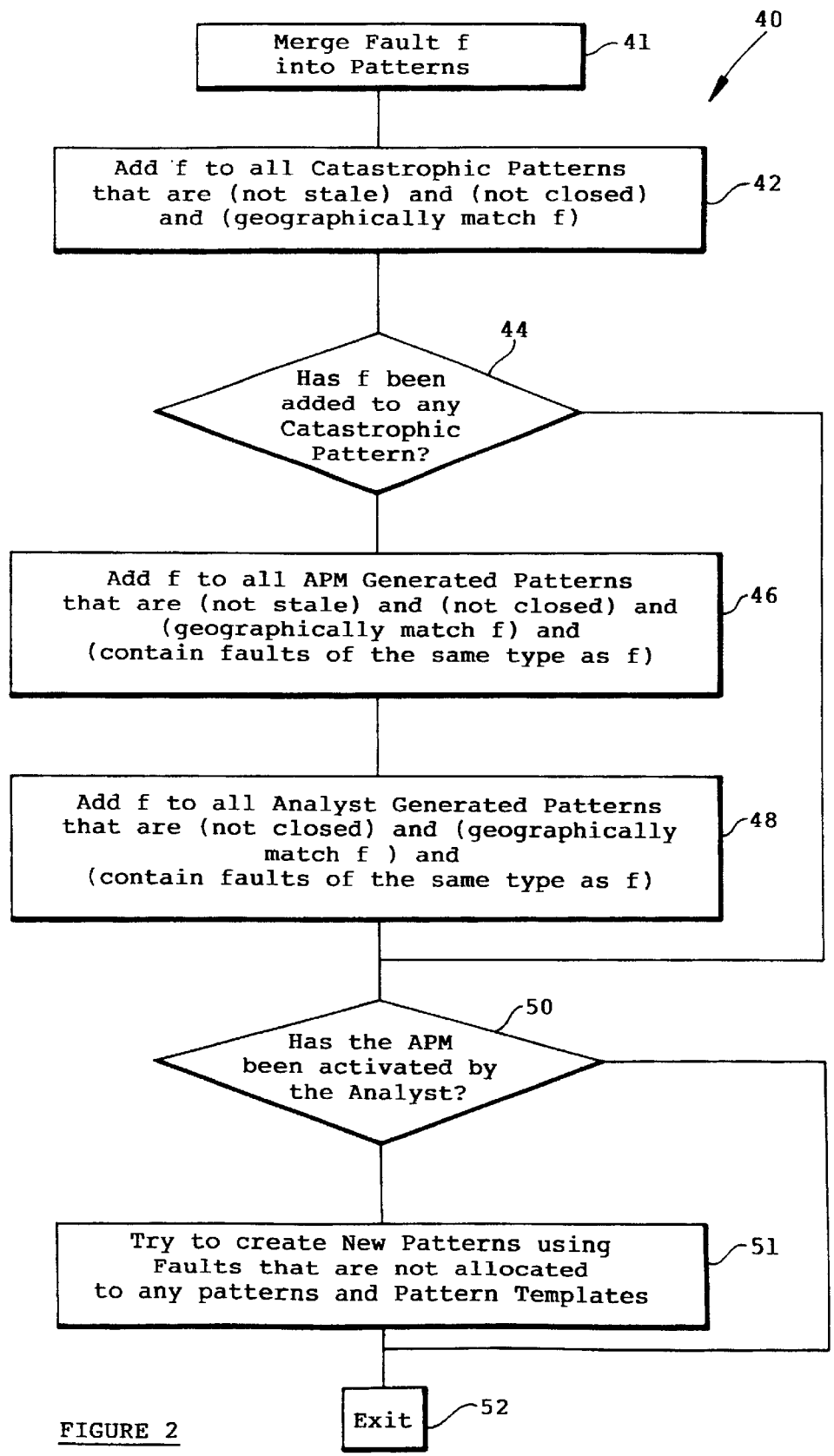

A preferred embodiment of the present invention is hereinafter described, by way of example only, with reference to the accompanying drawings, wherein:

FIG. 1 is a block and flow diagram of a preferred embodiment of a network fault system; and FIG. 2 is a flow diagram of a procedure of an Automatic Pattern Matcher of the network fault system.

The network fault system 2, as shown in FIG. 1, is able to identify patterns in faults reported by customers or users of a mobile telecommunications network, manage the creation and execution of a process for resolving fault patterns, and control the provision of fault pattern information to personnel supporting customers. The system 2 stores all fault and pattern data in an Oracle ™ database 4. Data on faults reported by the customers is held in customer fault databases 6 and the system 2 includes an interface 8 for providing the customer fault data to the database 4 from the customer fault databases 6. Network fault data is reported by a network analysis system 10, of the type described in the applicant's co-pending International Patent Application No. PCT/AU96/00511, and the system 2 includes a network data entry interface 12 which allows the reported network fault data to be accessed and passed to the fault and pattern database 4 via a pattern identification and distribution module 14 of the system 2. The module 14 includes a number of interfaces 16, 18, 20 and 22 for controlling processing of the data held in the fault and pattern database 4.

The network fault system 2 also includes a pattern matcher module 24 which comprises a template module 26 for defining pattern templates and an automatic pattern matcher engine (APM) 28 for forming fault patterns from the customer and network fault data based on the pattern templates.

Data held on the fault and pattern database 4 is accessible by a customer service module 30 which includes a consultant user interface 32 and a customer support user interface 34.

The network fault system 2 operates on a computer workstation, such as a Sun Microsystems Sparc Station 5 running Unix, and the interfaces 8 and 12, and the modules 14 and 24 are implemented by software written in C++. The customer service module 30 is also implemented in software running on personal computers used by customer service representatives (CSRs). Although a software implementation is described herein, the system 2 could also be implemented using a combination of application specific integrated circuits and firmware.

A help desk system 40 comprises a CSRs PC, the customer service module 30 and other customer support software stored on the PC, and is used to record details of a CSRs interaction with a customer when a customer reports a problem experienced using the customer's mobile station or handset. The help desk system 40 includes an inference engine which determines whether the reported problem is associated with the customer's mobile station or with the mobile telecommunications network. In either case, the help desk system 40 stores details of the customer's problem in one of the customer fault databases 6. Problems determined by the help desk system 40 to be network faults are placed into a specific queue in the customer fault databases 6 from which the system 2 can access the customer fault data using an interface 8. The customer fault data accessed by the interface 8 and stored in the fault and pattern database 4 includes the following fields for each record:

Field 1: Fault number
Field 2: Customer account name
Field 3: Customer address
Field 4: Mobile phone number
Field 5: Data and time the customer reported the problem
Field 6: Location of the fault: street, suburb, city, intersecting street
Field 7: Pattern number allocated to fault
Field 8: A maximum of two symptoms observed by the customer (a symptom is recorded as a code)

The network analysis system 10 is able to supply the fault system 2 with a list of faults which have occurred in network components or entities. The fields included in each record of the network fault data are as follows:

Field 1: Network entity type (cell or exchange, analogue or digital network)
Field 2: Network entity name (the name of the cell or exchange)
Field 4: Fault creation time stamp
Field 5: Fault name (recorded as a fault code)
Field 6: Confidence measure in fault (value between 0.0 and 1.0)
Field 7: List of symptoms supporting the fault (evidence)

Examples of fault names for cells of a mobile cellular network include:

Faulty Rx antenna

Fault in Rx path at base station

Misdirected Rx antenna

Misdirected Tx antenna

Examples of fault names for exchanges include:

Unable to handle offered traffic

Massive paging fault

Multi access across switch boundary

Switch problem

Examples of cell fault symptoms include:

Calls in progress dropouts>5%

Failed handoffs in>5%

The network fault data is accessed using the network data entry interface 12 and then finally entered into the fault and pattern database 4 using a technical support user interface 18 of the pattern identification and distribution module 14.

The APM 28 accesses fault data representative of a fault and using a set of pattern templates defined by the template module 26 it attempts to allocate the fault to a pattern. Patterns are used to cluster faults. The faults which comprise a pattern are believed to have a common cause. The inputted fault can not have previously been allocated to a pattern and needs to be cleared for processing first by an analyst using the analysis centre user interface 16. The pattern templates can be defined by a user of the system 2 using the template module 26, and the templates take the following general form:

No. of the same type of fault (>or>=) n over a period of time.

No. of faults of type X (>or>=) n AND . . . over a period of time.

No. of faults of type X (>or>=) n OR . . . over a period of time.

No. of faults of type X PLUS No. of faults of type Y>=10 over a period of time.

An example of a pattern template is:

No. of faults of type X>=4 OR No. of faults of type Y>4 over the last 60 days.

Unallocated faults are grouped together to form a pattern if they match a pattern template. Once a pattern has been formed, faults which match a type of the template and fall within the period constraints can then be added to the pattern. A fault is allocated to a pattern if the location of the fault is covered by the pattern. This is determined by comparing respective suburb lists associated with the fault and the pattern. Under the control of the analyst, the APM 28 can be instructed to execute geographic matching not only using a fault's suburb location but also using the adjacent suburbs. When a customer's fault is classified as belonging to a switching network element, matching is not only performed on the suburb, but is also performed using the exchange that serves the suburb. For example, if fault 1 occurs in suburb A served by exchange M and fault 2 occurs in a suburb B (not necessarily adjacent to suburb A) but it is also served by exchange M then the two faults would be allocated into the same pattern. The analysis centre user interface 16 can provide an analyst with the following information concerning a pattern:

(i) The faults that comprise the pattern, and the number of such faults.

(ii) The reason why the pattern is suggested (i.e. which pattern template does the pattern satisfy).

(iii) The suburbs that the pattern is likely to cover and the probability of the pattern appearing in the suburb.

Patterns produced by the APM 28 can be subsequently vetted by the pattern identification and distribution module 14 using the analysis centre user interface 16. The APM 28 may allocate a fault to two or more patterns, and then the analyst can choose the most appropriate pattern. The analysis centre user interface 16 can be used to instruct the APM 28 to re-evaluate the faults allocation by using wider searches, for example, extending geographic searching to adjacent suburbs. The APM 28 periodically operates in the background to form patterns from unallocated faults and to re-evaluate to the allocation of faults, where requested. The APM 28 advises the analysis centre user interface 16 when new patterns and fault allocations are available for checking.

The APM 28 can be directly activated by an analyst to suggest the set of patterns into which a fault can be merged, and can be activated automatically periodically, e.g. every hour, as desired, to merge unallocated faults into existing patterns and/or form new patterns from the unallocated faults. New patterns are formed using the templates defined by the template module 26, which includes an APM template editor described hereinafter. The APM 28 is also activated once every evening, as desired, to determine whether a pattern is stale, i.e. it does not any longer satisfy the template on which it is based. Once a pattern is stale, the APM 28 can no longer merge faults into the pattern. A pattern is declared to be stale if over the period of time specified in the pattern's template no additional faults have been allocated to the pattern. An analyst may also have discretion to declare a pattern stale or no longer stale.

When the APM 28 tries to merge a fault into a pattern it considers both the patterns generated by itself and an analyst. In the case of APM generated patterns a merge is successful if the pattern is not stale and its status is not "closed", the pattern already contains faults of the same type and at least one suburb in the fault's suburb list appears in the pattern's suburb list (a geographic match). Merging is identical for analyst generated patterns but in that case there is no notion of stale patterns. An analyst entered pattern can be declared to be catastrophic, in which case the pattern takes precedence over non-catastrophic patterns, and it absorbs all faults that geographically match the pattern (regardless of the types of the faults).

When fault data for a fault is entered in the system 2, the suburbs in which it may be present are specified within the fault's suburb list, which is stored in the database 4. The suburb list for a fault is generated on the basis of the location data provided with the customer or network fault data. The suburb list for a fault may be entered manually by an analyst using the analysis centre user interface 16, or generated automatically by the module 14 using a spatial database which relates locations reported by customers and network cells and equipment to specific suburbs. Within each row of the suburb list suburbs are to be considered joined by a logical AND (&). Each row has an associated confidence, a value between 0.0 to 1.0, where 0.0 denotes no confidence and 1.0 is total confidence that the fault occurred in the suburbs of the row. Between rows, AND lists of suburbs are joined by a logical Exclusive-OR (v). The final row of the suburb list is mandatory and it specifies the confidence for other suburbs, i.e. those not specified in the list. Tables 1 and 2 are examples of suburb lists for faults $f_1$ and $f_2$ where $f_i$rs represents fault i in reported suburbs.

TABLE 1

Suburb List for Fault $f_1$

| Hypothesis | Confidence | AND of Suburbs | Probabilistic Interpretation |
|---|---|---|---|
| $h_1f_1$ | 0.8 | A,B | $P(f_1rs|h_1f_1) = 0.8$ |
| $h_2f_1$ | 0.7 | C | $P(f_1rs|h_2f_1) = 0.7$ |
| $h_3f_1$ | 0.3 | D | $P(f_1rs|h_3f_1) = 0.3$ |
| $h_4f_1$ | 0.01 | Other | $P(f_1rs|h_4f_1) = 0.01$ |

TABLE 2

Suburb List for Fault $f_2$

| Hypothesis | Confidence | AND of Suburbs | Probabilistic Interpretation |
|---|---|---|---|
| $h_1f_2$ | 0.9 | A,B | $P(f_2rs|h_1f_2) = 0.9$ |
| $h_2f_2$ | 0.7 | C,F | $P(f_2rs|h_2f_2) = 0.7$ |
| $h_3f_2$ | 0.2 | E | $P(f_2rs|h_3f_2) = 0.2$ |
| $h_4f_2$ | 0.01 | Other | $P(f_2rs|h_4f_2) = 0.01$ |

The logical AND expression appearing in the i-th row of the suburb list of j-th fault is referred to as hypothesis $h_if_j$. The confidence value associated with the row can be probabilistically interpreted as $P(f_j$ in reported suburbs$|h_if_j)$.

Associated with each pattern there is also a suburb list. In the case of a non-catastrophic pattern the suburb list is not entered by an analyst, but it is generated by the APM 28 and it is a merge of the suburb lists of the faults contained in the pattern. The confidence in each row is also calculated by the APM 28 and the calculations are based on Bayesian Belief Networks, as discussed in "Fusion, Propagation and Structuring in Belief Networks" by Judea Pearl, Artificial Intelligence, Vol. 29, p. 241–288, with the assumption that the prior beliefs of all the hypotheses are equal. The assumption is valid since the prior beliefs are unknown.

For catastrophic faults the operator must enter one row of the pattern's suburb list and the APM 28 assigns it a confidence of 1.0 and other is set to 0.0., reflecting the definite nature of a catastrophic pattern.

The confidence for the rows of the pattern's suburb list are normalised, i.e. the sum of the rows confidence is equal to 1.0. When there is only one fault in a pattern, its suburb list is identical to the fault's list except that the row confidences are normalised. The fields of a pattern stored in the fault and pattern database 4 are as follows:

Field 1: Pattern number
Field 2: Status
Field 3: Creation time and date
Field 4: Pattern description (free format text)
Field 5: Pattern description for CSRs (English jargon free text)
Field 6: Group that currently owns or is responsible for the pattern (customer service, analysis centre, technical support, design)
Field 7: Identity of individual which currently owns or is responsible for the pattern
Field 8: List of fault numbers allocated to the pattern
Field 9: Closed time and date
Field 10: Identity of the individual that closed the pattern
Field 11: Reason for closing the pattern
Field 12: Flag indicating whether the pattern is catastrophic
Field 13: List of comments for each group
Field 14: Suburb list When the APM tries to merge a fault into a pattern, the fault must geographically match the pattern, i.e. at least one of the fault's suburbs must appear in the patterns suburb list or at least one of the fault's suburbs is adjacent to a suburb in the patterns suburb list. Similarly when the APM creates a new pattern all faults must geographically match at least one fault in the pattern. Two faults are said to geographically match (a) when there is at least one suburb common to both the faults'suburb lists, for example, suburbs A, B and C appear in both the fault list for $f_1$ and $f_2$ or (b) when at least one suburb of a fault is adjacent to a suburb of the other fault. Note that when an analyst performs a merge of a fault into a pattern the requirement of a geographic match does not need to be satisfied.

The APM 28 determines suburb adjacency by accessing a suburbs'database maintained in the database 4 of the system 2. This suburbs'database contains for each state, a list of all its suburbs, and for each suburb it contains a list of adjacent suburbs. In this database a country town is equivalent to a suburb.

In order to explain the merging of suburb lists and the calculation of confidences for the ensuing list, let us assume that pattern $p_1$ contains the fault $f_1$, and the APM then tries to merge $f_2$ into it. Before the merge is attempted, the suburb list of $p_1$ is identical to $f_1$, per Table 3 below, except that the confidences are normalised. The merge is possible because $f_1$ and $f_2$ geographically match. The hypotheses (rows of the merged suburb lists) of $P_1$ are composed of the hypotheses in both $f_1$ and $f_2$, with duplicates being removed. If one hypothesis is a subset of another, for example, $h_2f_1$ is a subset of $h_2f_2$, then both hypothesis are included in the merged suburb list.

The confidence of a hypothesis is calculated by taking a product of the confidences of the dependent hypothesis and multiplying it by N, a normalising factor (the sum of the products). The dependent hypothesis of a hypothesis of $p_1$ containing $f_1$ and $f_2$, are hypothesis from $f_1$ and $f_2$ that have the same AND of suburbs expression. If for $h_ip_1$, no hypothesis in $f_i$ can be found, then the hypothesis corresponding to the other, and of suburbs expression, is chosen as the dependent hypothesis. For example, in Table 4, the dependent hypothesis for $h_2p_1$ from $f_2$ is $h_4f_2$.

TABLE 3

Hypothesis and Confidences for $p_1$ containing $f_1$

| Hypothesis | Dependent Hypothesis | AND of Suburbs | Probabilistic Interpretation | Confidence |
|---|---|---|---|---|
| $h_1p_1$ | $h_1f_1$ | A,B | $N*P(f_1rs|h_1f_1)$ | 0.442 |
| $h_2p_1$ | $h_2f_1$ | C | $N*P(f_1rs|h_2f_1)$ | 0.387 |
| $h_3p_1$ | $h_3f_1$ | D | $N*P(f_1rs|h_3f_1)$ | 0.166 |
| $h_4p_1$ | $h_4f_1$ | Other | $N*P(f_1rs|h_4f_1)$ | 0.005 |

TABLE 4

Hypothesis and Confidences for $p_1$ containing $f_1$ and $f_2$

| Hypothesis | Dependent Hypothesis | AND of Suburbs | Probabilistic Interpretation | Confidence |
|---|---|---|---|---|
| $h_1p_1$ | $h_1f_1,h_1f_2$ | A,B | $N*P(f_1rs|h_1f_1)*P(f_2rs|h_1f_2)$ | 0.9742 |
| $h_2p_1$ | $h_2f_1,h_4f_2$ | C | $N*P(f_1rs|h_2f_1)*P(f_2rs|h_4f_2)$ | 0.0095 |
| $h_3p_1$ | $h_4f_1,h_2f_2$ | C,F | $N*P(f_1rs|h_4f_1)*P(f_2rs|h_2f_2)$ | 0.0095 |
| $h_4p_1$ | $h_3f_1,h_4f_2$ | D | $N*P(f_1rs|h_3f_1)*P(f_2rs|h_4f_2)$ | 0.0040 |

TABLE 4-continued

Hypothesis and Confidences for $p_1$ containing $f_1$ and $f_2$

| Hypothesis | Dependent Hypothesis | AND of Suburbs | Probabilistic Interpretation | Confidence |
|---|---|---|---|---|
| $h_5p_1$ | $h_4f_1,h_3f_2$ | E | $N*P(f_1rs|h_4f_1)*P(f_2rs|h_3f_2)$ | 0.0027 |
| $h_6p_1$ | $h_4f_1,h_4f_2$ | Other | $N*P(f_1rs|h_4f_1)*P(f_2rs|h_4f_2)$ | 0.0001 |

The APM 28 executes a procedure 40 which begins, as shown in FIG. 2, at step 41 where a fault f is collected and an attempt is made to merge the fault f into a pattern. At step 42, an attempt is made to add the fault f to all catastrophic patterns which are not stale, not closed and which also geographically match the fault. Next at step 44, a check is made to determine whether the fault has been added to any catastrophic pattern, and if so the procedure 40 breaks to step 50. If the fault has not been added to a catastrophic pattern, at step 46 an attempt is made to add the fault to patterns which have been generated by the APM 28 and which are not stale, not closed, geographically match f and include faults of the same type as f. Faults are considered to be of the same type if they have the same symptom codes and are of the same fault class. Next at step 48, an attempt is made to add f to all faults which have been generated by an analyst and which are not closed, geographically match f and contain faults of the same type as f. At step 50 a determination is made as to whether the APM 28 has been activated by an analyst, and if so the procedure 40 ends at step 52, otherwise the APM moves to step 51. The APM 28 at step 51 seeks to create new patterns using the pattern templates and any faults in the fault and pattern database 4 which have not been allocated to a pattern.

The APM editor of the template module 26 is used to create templates. Templates are used by the APM 28 to form patterns from faults that are not already allocated to a pattern. All faults that match a template are grouped into a pattern, as mentioned previously.

A template file can contain multiple templates of the following types, with exception that it can contain only one template of the type SAME:
 (i) SAME TEMPLATE [No. of faults of the same type (>or>=) n] over the last d days.
 (ii) OR TEMPLATE [No. of faults of type X (>or>=) n] v [No. of faults of type Y (>or>=) m] v ... over the last d days.
 (iii) AND TEMPLATE [No. of faults of type X (>or>=) n] & [No. of faults of type Y (>or>=) m] & ... over the last d days.
 (iv) SUM TEMPLATE [No. of faults of type X]+[No. of faults of type Y] + ... [(>or>=) n] over the last d days.

For the OR, AND and SUM types of templates, fault types need to be specified. A fault type is specified by selecting the fault's class and code on add and edit condition windows. Four classes of faults include:
 (a) Analogue Network Customer Reported Faults
 (b) Digital Network (GSM) Customer Reported Faults
 (c) Network Reported Cell Faults
 (d) Network Reported Exchange Faults The pattern identification and distribution module 14 allows mobile network analysts to form fault patterns and distribute them for processing amongst appropriate groups. The system 2 has an upper limit on the number of groups, and each group, although being able to forward a pattern to any other group, may be restricted by allowed referrals defined for each region. The module 14 includes one analysis centre user interface 16, one technical support user interface 18, one supervisor user interface 22 and a number of design user interfaces 20 for region groups. The design user interface 20 essentially allows a group member to view all of the patterns forwarded to the group, add a remark to the pattern, and forward a pattern to another group.

Two forms of pattern distribution are provided, the first form being a transferring of responsibility or ownership for a pattern to another group and in the second form responsibility or ownership remains with the initial group but an action to be performed on the pattern can be forwarded to another group. Each member of the design group has on their interface 20 an indicator of the number of faults that have been allocated to the group, but are not yet allocated to a group member.

The analysis centre user interface 16 allows a mobile network analyst to perform the following tasks:
 (i) Extract customer fault data from the customer fault databases 6 when prompted by the interface 8 on their availability.
 (ii) Determine whether the extracted fault should be processed by the system 2. This process can be considered as executing a fault gate. If the fault is not to be processed by the system 2, it is placed in a different queue of the customer fault databases 6. Once the fault is accepted for processing a suburb list is appended to the fault, which may be done by an analyst. If the fault is not placed in the system 2 for processing, the reasons for returning it to the customer fault databases 6 are placed in a clearance comments fields of the customer fault data.
 (iii) View all faults and patterns held in the fault and pattern database 4 so that faults can be manually merged into existing and new patterns. When an analyst manually forms a pattern, rules used in forming the pattern can be added to the record of the pattern.
 (iv) Invoke the APM 28 to produce suggested patterns. The suggested patterns can then be checked for acceptability, by executing a process referred to as a pattern gate before the patterns are further processed. On passing a pattern via the gate, the analyst can allocate a priority for processing of the pattern.
 (v) If the fault is hard-on fault, the analyst can transfer a pattern including the fault to a responsible group. A hard-on fault is a fault which is obvious, and not subtle, i.e. the link between a base station and exchange is down.
 (vi) If the fault is subtle, the analyst can add comments and pass the pattern including the fault to the technical support user interface 18 for further processing.
 (vii) When a pattern returns from a design group with an action plan, the analyst can translate the action plan into a plain English description which can then be presented to the CSRs. The elements of the pattern viewable by the CSRs is controlled using the analysis centre user interface 16, which prompts the analyst on the arrival of patterns from the design group.
  (viii) When a pattern returns from a design group with a status of being fixed, the analyst can automatically add clearance comments into the customer fault databases 6 for each fault in the pattern. Clearance comments can also be added to hard-on faults and other faults not belonging to a pattern. When a clearance comment is added to a fault, the fault is placed in a feedback queue in the customer fault databases 6.
  (ix) Archive fixed patterns.
  (x) Delete fixed faults and patterns from the fault and pattern database 4.

The analysis centre user interface 16 also enables the entry of faults detected by test surveys into the database 4. Test survey faults can be merged into patterns manually or sing the APM 28 if such faults include location information from which a suburb list can be derived.

When part of the network becomes completely disabled or a network outage occurs, the interface 16 allows an analyst to add a catastrophic pattern into the fault and pattern database 4 either manually or using the APM 28. Depending on the severity of the fault, a message can also be broadcast to the customer service module 30. The analyst enters the suburbs the outage impacts, and once the pattern is entered, all faults reported in the impacted suburbs, regardless of times, are allocated to the catastrophic pattern.

All patterns are allocated a status which affects whether a pattern can be viewed by he CSRs using the customer service module 30, as follows:

(i) APM suggested. The APM 28 has suggested the pattern. Not viewable by CSRs.

(ii) Analyst suggested. An analyst has suggested the pattern. Not viewable by CSRs.

(iii) Accepted. The analyst has accepted a suggested pattern, but no action plan has been created. Not viewable by CSRs.

(iv) Planned. A design group has created an action plan. The pattern is only available to a CSR if a fault that he/she queries belongs to the pattern.

(v) Inactivated. The pattern exists but the current action plan is "no action". More faults can be added to the pattern. CSR viewable under control of analysis centre user interface 16.

(vi) Considered. The action plan has been considered by a group and its outcomes are sent to the CSRs for customer follow-up. Every change of responsibility or group, or action by a group raises an "activity" or advice to the CSRs if a network analyst believes it's relevant.

(vii) Closed. The problem indicated by the pattern is fixed. Under analysis centre user interface control advice is sent to the CSRs when the pattern is closed. A closed pattern remains available to the interfaces 16, 18, 20 and 22 for a specific period of time. After that time expires the pattern is archived. Once the pattern is archived it is no longer viewable by CSRs.

Only statuses (i), (ii) and (vii) are mandatory, and the others may be specified on a regional basis. Each group may set up non-mandatory statuses, as desired, for the patterns they process.

Hereinafter reference is made to specific screen interfaces and the buttons which may be used on those interfaces. It will be understood that whilst the function of the interfaces may not vary, the particular configuration and buttons used on the screens may vary considerably.

The APM template editor is activated by clicking on an APM Template Editor button on a top window of the analysis centre user interface 16.

The editor is used to create a New file, or Edit or Delete a file of templates. The templates in the active template file are used by the APM 28 to form new patterns. A file is made active by selecting it and then clicking on the Set Active Template File button.

A new template file is created by entering a filename in a File field and pressing a New button. A template file is edited by selecting the file in a scrolling list and then clicking on an Edit button. When an Edit or New button is selected a window is displayed which contains a summary of the templates appearing in the file. At this stage a new template can be added by selecting the Add Template button or an existing template can be modified by selecting its entry in the summary list and then clicking on Edit Template. Clicking on either of these buttons pops up a window containing a detailed description of the template. On this window a template's details can be added or modified, including its type, whether geographic matching is performed when assigning faults to a pattern that is based on the template, the number of previous days over which fault counts are taken, and the fault conditions. Conditions (items appearing in square brackets in the following description of template types) can be added, edited and deleted from a template by selecting the Add Condition, Edit Condition and Delete Condition buttons.

By pressing a Get Faults button of the analysis centre user interface 16 the user is presented with a screen which is used to extract customer fault data from a queue of the customer fault databases 6. The user should select whether the next fault to be examined for possible entry in to the network fault system 2 is of type analogue or digital. An exclusive type selection box is provided at the top of the screen for this purpose. Activating a Get Next button places a summary of the fault in to a scrolling list and it is "actioned" in the customer fault databases 6. By clicking on the summary line in the scrolling list, a screen displaying all fault information is displayed.

In the fault display, some fields will already be filled in. These fields are non-editable and contain information obtained from the customer fault databases 6.

Selection of a Cancel button will close the fault display. The same fault can be viewed again later. The fault will not be entered into the network fault system 2 should Cancel be chosen.

Towards the bottom of the screen, one of three choices is required:

(i) Hard-on. The fault is a hard—on fault. The fault is saved in the network fault system 2 and a facsimile can be printed.

(ii) Further Analysis. The fault is suitable for entry in to the network fault system 2 without further processing at this stage.

(iii) Refer On. The fault is probably not suitable for entry into the network fault system 2. A screen will be displayed where certain action is required. A tick box is used to select whether or not the fault should be entered into the network fault system 2. By selecting Comment and Queue fields are sent to the customer fault databases 6, updating the clearance comments and dispatch code fields respectively of the customer fault databases 6 fault record. An OK button will activate the refer on.

By selection of Hard-On, Further Analysis or Refer On followed by the Continue button, the appropriate action is taken. A fault number will be allocated by the network fault system 2 whenever a fault is entered. Continue will remove the fault summary from the scrolling list.

A test drive fault entry procedure of the interface 16 allows entry of special fault information. Such information could be obtained from fault surveys, field testing, etc. A Continue button will allow entry of the fault in to the network fault system 2. A fault number will be allocated by the network fault system 2. Geographic information regarding test drive faults is specified identically as for faults sourced from the customer fault databases 6.

By selecting Pattern Entry an empty pattern (no faults) can be created. A consultant view tick box can be used to make the corresponding pattern description viewable to CSRs via the customer service module 30. At the time of entering faults into the network fault system 2, an Add To New may be selected. This will create a pattern with one fault merged in to it, that fault being the one currently under view.

A Comments button will bring up a screen which is used to enter information regarding progress of action upon the pattern. Each group is assigned a box where comments may be entered. An additional box is provided where a description of the planned action for the pattern can be entered. The description in this box is specifically for the customer service module (CSM) 30.

When an action plan has been formulated, date fields: action plan creation date; and action plan completion date, are used. In the present system 2, the comments screen is open to modification by any person.

There are four main groups: CSR, mobile network analysis centre (MNAC), technical support and design. A pattern has an associated ownership of both its action and responsibility. The ownership will be with one of the members of a group. When a pattern is created, both the responsibility and action for the pattern will belong to the creating group, MNAC. The ownership of either action or responsibility can be changed to another group provided the current owner initiates the handover. Patterns are transported to a group for subsequent grabbing, where a newly transported pattern is assigned to a member of the group. A pattern of no faults may be selected for transport to another group using Transport Action and Transport Responsibility buttons. Pressing a Continue button will enter the newly created pattern in to the network fault system 2. The comment and transport information is saved at the time of selecting Continue.

Pattern searching enables a user to retrieve patterns from the network fault system 2, update pattern information, merge faults in to the searched for pattern and clear patterns. Clicking a Pattern Search button will bring up a screen where search criteria can be entered. This is essentially a formulation of a request that the network fault system 2 list all those patterns that comply with the search criteria. In each field, data can be entered in three ways:

(a) Absolute value, e.g. Pattern Number—32.
(b) Group of values, e.g. Suburb-Parramatta, Mosse Vale, Chatswood.
(c) Wild card, e.g. Pattern Number—3% (This would match all patterns where the first digit of the pattern number was 3). The "%" matches any string of zero or more characters except null.

The search is executed using a Search button. The result of the search operation is presented in a large screen where each row is a summary of a pattern that matched the search criteria. Arrow buttons that appear on the screen are used to scroll through the list of patterns that were found.

Once a search has been executed one of the patterns found to match the search criteria can be examined and updated. This is done by using tick boxes at the left of the screen brought up after a pattern search is executed. A Detail button will expand information on the pattern which has had its tick box selected.

The pattern information can be changed at this point. Transfers and updates to comments can also be made. The changes are stored in the network fault system 2 when the Update button is chosen.

Clearing of patterns involves clearing all of the faults that comprise the pattern. This process will communicate with the customer fault databases 6 updating Dispatch Code and Clearance Comments fields of the fault on the customer fault databases 6. The information sent to the customer fault databases 6 as part of the clear procedure is entered into the screen brought up by the Clear Pattern button. The Dispatch Code will be set to "FBCK" and the Clearance Comments field will be set to Cause Code, Clearance Code and Comment fields of the current screen.

Merging faults into patterns involves associating a given list of faults with a given pattern, as described previously. Fault Search can be chosen after a pattern search is executed. The fault search will require entry of search criteria in a similar fashion to searching for a pattern. The fault search operation also presents the result of the search in a large screen similar to that for patterns. An Add Faults to Pattern button merges the tick box selected faults into the tick box selected pattern. If faults chosen for the merge already belong to another pattern, such faults will be removed from the other pattern before the merge takes place. Following a merge the suburb list of the pattern is updated to reflect the merge. At the time of entering customer faults in to the network fault system 2, a Pattern Search may also be executed. In this case, the fault merged into the pattern selected will be that fault currently under view.

Fault search enables a user to retrieved faults from the network fault system 2, update fault information, merge faults into a pattern and clear faults. The Fault Search button allows entry of fault search criteria, as described above. Faults can be examined and updated by use of tick boxes displayed after search execution. Operations of Detail, Update and Clear buttons is similar to that for patterns.

A group of faults can be selected for a merge operation by using the tick boxes of the search result screen to select faults. The Pattern Search button, followed by Add Faults to Pattern will merge the tick boxed faults into the tick boxed pattern.

A View Own Patterns button provides a special form of pattern searching. The network fault system 2 is queried for those patterns for which the ownership of either the responsibility or action or both, is with the present user of the system. Patterns may only be updated and transported at this stage with the added proviso that transport can only take place if the pattern is owned by the present user of the system. Using a View New Action Patterns button, the network fault system 2 is queried for those patterns that have had action transported to the group of the present user of the system. Using a View New Responsibility Patterns button, the network fault system 2 is queried for those patterns that have had responsibility transported to the group of the present user of the system. Grab and Continue buttons will assign the ownership of the responsibility for the pattern to the present user of the system.

The customer service module 30 provides a CSR with access to the network fault system 2 and runs under Microsoft Windows™ on a PC. The connection between the PC and the Unix machine of the network fault system 2 can be achieved using a communications package such as Oracle Glue™. The consultant user interface 32 enables the CSR to carry out enquiries on the pattern information held in the fault and pattern database 4 for the purposes of informing customers of a pattern which may be causing their particular fault. The interface 32 allows a CSR to list the set of patterns in a suburb.

The CSR types in the suburb name, and its spelling is checked. If the suburb is valid a list of patterns appearing in that suburb is displayed. For each pattern in the list, its identification number, description and impact area is displayed. The impact area is a landmark within the suburb, e.g. road, intersection, shopping centre, etc. The CSR can expand a pattern, and in the expanded version, in addition to the impact area, the description contains a plain English explanation of the pattern, an action plan as well as a number of other less critical fields.

For patterns that are suggested by the APM 28, the impact area is manually entered by a MNAC analyst as the APM 28 does matching on a suburb level. If an outage covers the suburb queried, the outage pattern appears at the top of the list of patterns impacting the area.

Patterns with a particular identification number can also be retrieved.

The customer support user interface 34 enables a CSR to carry out the reporting of pattern information to customers whose faults have made up that pattern and the subsequent transfer of the pattern information back to the MNAC. The interface can be used to list all of the patterns transferred to the customer support group not allocated to any CSR.

The patterns are presented in a list, and each pattern entry in the list contains the date it was created, its description and impact area. The CSR can expand a pattern entry in the list. The expanded pattern contains a description of pattern (understandable by the CSR). On the expanded pattern the CSR has the ability to allocate responsibility for handling the pattern to himself/herself, view the customer faults belonging to the pattern, and can transfer the pattern back to MNAC and the analysis control user interface 16.

A list of all the patterns transferred to the customer support group and allocated to a specific CSR can also be obtained.

A CSR activates the customer service module 30 by clicking on a network fault system icon. Next the operator is prompted to enter his/her initials (3 characters) and a password, but the entered values are not verified. The operator's initials are used to tag patterns as belonging to the operator (for grabbing patterns) and the password is used to access the fault and pattern database 4 in the network fault system 2. A window then appears in which a button needs to be pressed to gain connection to the network fault system 2.

All patterns that have not been "closed" and that are viewable by CSRs can be viewed by entering the suburb into a For Suburb field and hitting return. This brings up a list of all the patterns in the suburb. By double clicking on an entry full details of the selected pattern are displayed.

MNACs can transfer patterns to the CSR group for processing, as described previously. By clicking on a New button a list of such patterns that have not yet been grabbed by a CSR is displayed. By double clicking on an entry in that list a detailed description of the pattern appears. Clicking on a check box Grab Pattern, assigns ownership of the pattern to the CSR identified by the initials which were entered on starting up the customer service module 30.

Clicking on an Own button displays the list of patterns grabbed by the CSR. Double clicking on an entry in the list brings up a window containing a detailed description of the pattern. The pattern detail window contains a scrolling list of faults belonging to the pattern. Double clicking on an entry in that list brings up a detailed description of the fault, which includes customer contact details. Once the CSR is finished processing the pattern it can be returned to the MNAC group by clicking on a check box Transfer Pattern to MNAC.

The technical support user interface 18 enables a technical support consultant (TSC) to perform the following tasks:
  (a) Retrieve patterns forwarded to the technical support group from MNAC or a design group. Alternatively, a consultant may choose to be prompted on the arrival of such patterns.
  (b) Add the technical support group comments to a pattern, before forwarding to a design group or MNAC.
  (c) Forward confirmed patterns (received from MNAC) to a design group for processing.
  (d) Forward patterns that the TSC could not confirm to MNAC.
  (e) View all the patterns in the fault and pattern database 4.
  (f) Enter network faults from the network analysis system 10.

The technical support user interface 18 provides Pattern Search, Search and Detail buttons which allow execution of the same pattern searching procedures as for the analysis centre user interface 16. A Comments button also brings up a screen which can be used to enter information regarding progress of action on the pattern in a box for the group. Transport Action, Transport Responsibility and Update buttons also perform the same functions as for the analysis centre user interface 16.

Faults can be searched using procedures executed by clicking on a Fault Search button, and patterns viewed using view using view own patterns, Grab and Continue buttons as for the analysis centre user interface 16. The interface 18 also provides access to the network data entry user interface 12, which allows the TSC to enter into the fault and pattern database 4 faults which have been detected by the network analysis system 10 and are believed to have an affect on customers. When a network fault is entered into the database 4, the TSC enters a description of the network fault, and a set of one or more suburbs which the fault affects. Alternatively, as discussed previously, a spatial data system which maps network cells and exchanges to suburbs can be invoked to enter automatically the set of suburbs.

An entered network fault can be considered as a pattern with which customer faults can be merged, and the merger may be performed either manually using the analysis centre user interface 16 or automatically using the APM 28, as described previously.

The design user interface 20 is the same as the technical support user interface 18 and allows a design consultant (DC) to perform the following tasks:
  (a) Retrieve patterns forwarded to a design group from the technical support group. Alternatively, a consultant may choose to be prompted on the arrival of such patterns.
  (b) Add an action plan to a pattern, and to manage the status of the plan.
  (c) Forward patterns for processing to the technical support group or directly to MNAC.
  (d) View all the patterns in the fault and pattern database 4.

The design group plans and then coordinates the solution of a fault amongst a number of groups which may not have access to the network fault system 2. Under such circumstances the interface 20 enables the DC to record the interactions of the design group with these groups. In addition, the design group may instruct a number of its staff to perform a series of tests in order to formulate an appropriate action plan. The interface 20 will enable the recording of the nature of test to be performed, the identity of the staff that perform the tests and the results of the tests.

The supervisor user interface 22 allows a supervisor for the pattern identification and distribution module 14 to perform a number of supervisory tasks on the module 14, which include process performance specification and report production.

In a process performance specification a supervisor can specify the amount of time that an element of the pattern distribution process can take. For example, technical support must forward a pattern either back to MNAC or to a design group within four hours of receiving it from MNAC, and a design group must forward a pattern back to MNAC within a week from when it was received from technical support.

The reports that can be produced by the interface 22 include:
- (a) List of known patterns sorted geographically.
- (b) Status of a pattern, including the group working on it and how long it will take to solve.
- (c) List of each area giving turn around times, outstanding patterns, clearance times and times for each stage of the pattern distribution process.
- (d) Status of the fault and pattern database 4, which includes the number of cleared and uncleared faults per month.
- (e) List of patterns for which the process performance specifications were not met.
- (f) An audit trail for a pattern, such as who did what and when.

Each group has access to statistics regarding its own performance.

What is claimed is:

1. A network fault system for a mobile telecommunications network including:
   a first interface for accessing first fault data representative of faults reported by users of mobile stations of said network;
   a second interface for accessing second fault data representative of faults in said network determined by a network analysis system; and
   pattern matching means for allocating said first and second fault data to fault patterns representative of faults having at least one common characteristic.

2. A network fault system as claimed in claim 1, wherein the common characteristic is geographic location.

3. A network fault system as claimed in claim 2, wherein a further common characteristic is fault type.

4. A network fault system as claimed in claim 1, including pattern generation means for generating said fault patterns using respective fault templates to allocate said fault data to said fault patterns.

5. A network fault system as claimed in claim 4, wherein said fault templates represent a predetermined condition having occurred over a predetermined period of time, said condition comprising a predetermined number of faults of a predetermined type having occurred.

6. A network fault system as claimed in claim 5, wherein said fault templates represent a logical relationship between at least two of said predetermined condition having occurred over a predetermined period of time.

7. A network fault system as claimed in claim 4, wherein said fault templates represent a predetermined number of faults of different predetermined types having occurred.

8. A network fault system as claimed in claim 1 or 4, wherein said fault patterns each include geographic data representing at least one geographic location associated with respective faults, said fault data each include location data representative of at least one geographic location associated with the fault represented by said fault data, and said pattern matching means allocates said fault data to one of said patterns when the location data of the fault data corresponds to the geographic data of the pattern.

9. A network fault system as claimed in claim 8, wherein to allocate the fault data to said pattern, the pattern further includes faults of the same type as the fault represented by said fault data.

10. A network fault system as claimed in claim 4, wherein said pattern generation means generates new fault patterns by applying said templates to said fault data not allocated to existing fault patterns.

11. A network fault system as claimed in claim 1, including a customer service system for providing access to said patterns when processing said faults reported by users, and for generating and storing said first fault data.

12. A network fault system as claimed in claim 1 or 11, including a distribution module allowing access, editing and transmission of said patterns by parties having different tasks in relation to processing of said patterns.

13. A network fault system as claimed in claim 12, wherein said patterns have respective statuses, and the status of a pattern is changed to closed by one of said parties when a network problem associated with the faults of the pattern is fixed.

14. A network fault system as claimed in claim 8, wherein said location data includes:
   locations and location confidence values representing the probability of the fault of said fault data having occurred at at least one of the locations and another confidence value representing the probability of the fault not having occurred in said locations; and
   said geographic data includes locations and location confidence values representing the probability of the faults of said pattern having occurred at at least one of said locations and another confidence value representing the probability of the faults not having occurred in said locations, said confidence values of said pattern being normalised.

15. A network fault system as claimed in claim 14, wherein said location data corresponds to said fault data when at least one of the locations of said location data is the same as one of the locations of said geographic data.

16. A network fault system as claimed in claim 15, wherein on allocating said fault data to said pattern, said confidence values of said pattern are the product of said location confidence values of said fault and said another confidence value of said pattern, the product of said location confidence values of said pattern and said another confidence value of said fault data and, for location confidence values of said fault data and said pattern having the same respective locations, the product of these location confidence values.

17. A fault pattern matching process including:
   accessing first fault data representative of faults reported by users of mobile stations of a mobile telecommunications network;
   accessing second fault data representative of faults in said network determined by a network analysis system; and
   matching said first and second fault data to fault patterns representative of faults having at least one common characteristic.

18. A fault pattern matching process as claimed in claim 17, wherein the common characteristic is geographic location.

19. A fault pattern matching process as claimed in claim 18, wherein a further common characteristic is fault type.

20. A fault pattern matching process as claimed in claim 17, including generating said fault patterns using respective fault templates to allocate said fault data to said fault patterns.

21. A fault pattern matching process as claimed in claim 20, wherein said fault templates represent a predetermined condition having occurred over a predetermined period of time, said condition comprising a predetermined number of faults of a predetermined type having occurred.

22. A fault pattern matching process as claimed in claim 21, wherein said fault templates represent a logical relationship between at least two of said predetermined condition having occurred over a predetermined period of time.

23. A fault pattern matching process as claimed in claim 20, wherein said fault templates represent a predetermined number of faults of different predetermined types having occurred.

24. A fault pattern matching process as claimed in claim 17 or 20, wherein said fault patterns each include geographic data representing at least one geographic location associated with respective faults, said fault data each include location data representative of at least one geographic location associated with the fault represented by said fault data, and matching said fault data to one of said patterns occurs when the location data of the fault data corresponds to the geographic data of the pattern.

25. A fault pattern matching process as claimed in claim 24, wherein matching the fault data to said pattern, the pattern further includes faults of the same type as the fault represented by said fault data.

26. A fault pattern matching process as claimed in claim 20, including generating new fault patterns by applying said templates to said fault data not allocated to existing fault patterns.

27. A fault pattern matching process as claimed in claim 17, including providing access to said patterns when processing said faults reported by users, and generating and storing said first fault data.

28. A fault pattern matching process as claimed in claim 17 or 27, including enabling access, editing and transmission of said patterns by parties having different tasks in relation to processing of said patterns.

29. A fault pattern matching process as claimed in claim 28, wherein said patterns have respective statuses, and including one of said parties changing the status of a pattern to closed when a network problem associated with the faults of the pattern is fixed.

30. A fault pattern matching process as claimed in claim 24, wherein said location data includes:

locations and location confidence values representing the probability of the fault of said fault data having occurred at at least one of the locations and another confidence value representing the probability of the fault not having occurred in said locations; and said geographic data includes locations and location confidence values representing the probability of the faults of said pattern having occurred at at least one of said locations and another confidence value representing the probability of the faults not having occurred in said locations, said confidence values of said pattern being normalised.

31. A fault pattern matching process as claimed in claim 30, wherein said location data corresponds to said fault data when at least one of the locations of said location data is the same as one of the locations of said geographic data.

32. A fault pattern matching process as claimed in claim 31, wherein said matching of said fault data to said pattern includes setting said confidence values of said pattern to the product of said location confidence values of said fault and said another confidence value of said pattern, the product of said location confidence values of said pattern and said another confidence value of said fault data and, for location confidence values of said fault data and said pattern having the same respective locations, the product of these location confidence values.

* * * * *